(12) United States Patent
Lin et al.

(10) Patent No.: US 12,010,011 B2
(45) Date of Patent: *Jun. 11, 2024

(54) FAST REROUTE FOR ETHERNET VIRTUAL PRIVATE NETWORKS—VIRTUAL EXTENSIBLE LOCAL AREA NETWORK

(71) Applicant: Juniper Networks, Inc., Sunnyvale, CA (US)

(72) Inventors: Wen Lin, Andover, MA (US); Yi Zheng, Concord, MA (US); Mukesh Kumar, Cupertino, CA (US); Xichun Hong, Fremont, CA (US); Selvakumar Sivaraj, Sunnyvale, CA (US); Vamshi Krishna Voruganti, Cupertino, CA (US); John E. Drake, Pittsburgh, PA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/060,521

(22) Filed: Nov. 30, 2022

(65) Prior Publication Data

US 2023/0095253 A1     Mar. 30, 2023

Related U.S. Application Data

(63) Continuation of application No. 17/301,351, filed on Mar. 31, 2021, now Pat. No. 11,546,253.

(51) Int. Cl.
*H04L 45/28* (2022.01)
*H04L 12/46* (2006.01)
*H04L 41/0668* (2022.01)

(52) U.S. Cl.
CPC .......... *H04L 45/28* (2013.01); *H04L 12/4633* (2013.01); *H04L 12/4675* (2013.01); *H04L 41/0668* (2013.01)

(58) Field of Classification Search
CPC . H04L 45/28; H04L 12/4633; H04L 12/4675; H04L 41/0668
See application file for complete search history.

(56) References Cited

U.S. PATENT DOCUMENTS

| 7,990,993 B1 | 8/2011 | Ghosh et al. |
| 8,437,248 B2 | 5/2013 | Li et al. |

(Continued)

FOREIGN PATENT DOCUMENTS

| CN | 1984076 A | 6/2007 |
| CN | 101483558 A | 7/2009 |

(Continued)

OTHER PUBLICATIONS

Extended Search Report from counterpart European Application No. 21180926.4 dated Nov. 18, 2021, 9 pp.

(Continued)

*Primary Examiner* — Eric Myers
(74) *Attorney, Agent, or Firm* — Shumaker & Sieffert, P.A.

(57) ABSTRACT

Techniques are described for providing fast reroute for traffic in EVPN-VXLAN. For example, a backup PE device of an Ethernet segment is configured with an additional tunnel endpoint address ("reroute tunnel endpoint address") for a backup path associated with a second split-horizon group that is different than a tunnel endpoint address and first split-horizon group for another path used for normal traffic forwarding. The backup PE device sends the reroute tunnel endpoint address to a primary PE device of the Ethernet segment, which uses the reroute tunnel endpoint address to configure a backup path to the backup PE device over the core network. For example, the primary PE device may install the reroute tunnel endpoint address within its forwarding plane and one or more operations to cause the primary PE device to encapsulate a VXLAN header includ- (Continued)

ing the reroute tunnel endpoint address when rerouting the packet along the backup path.

18 Claims, 4 Drawing Sheets

(56) References Cited

U.S. PATENT DOCUMENTS

| | | | |
|---|---|---|---|
| 8,806,058 | B1 | 8/2014 | Mackie et al. |
| 10,382,332 | B2 | 8/2019 | Hoang et al. |
| 10,826,829 | B2 | 11/2020 | Dong et al. |
| 11,057,295 | B1 | 7/2021 | Lin et al. |
| 11,303,474 | B1 | 4/2022 | Gornal M. et al. |
| 11,546,253 | B2 | 1/2023 | Lin et al. |
| 2016/0021015 | A1 | 1/2016 | Thoria et al. |
| 2016/0261487 | A1 | 9/2016 | Singh |
| 2017/0063600 | A1 | 3/2017 | Singh et al. |
| 2017/0141963 | A1 | 5/2017 | Chalapathy et al. |
| 2017/0250904 | A1 | 8/2017 | Singarayan et al. |
| 2017/0288948 | A1 | 10/2017 | Singh et al. |
| 2018/0109444 | A1 | 4/2018 | Sajassi et al. |
| 2019/0007309 | A1 | 1/2019 | Arora et al. |
| 2020/0021523 | A1 | 1/2020 | Wang et al. |
| 2020/0127885 | A1 | 4/2020 | Arora et al. |
| 2020/0127919 | A1 | 4/2020 | Nagarajan et al. |
| 2020/0280514 | A1 | 9/2020 | Zhang et al. |
| 2020/0336334 | A1 | 10/2020 | He et al. |
| 2021/0152464 | A1 | 5/2021 | Brissette et al. |
| 2021/0234727 | A1 | 7/2021 | Ranpise et al. |
| 2022/0272027 | A1 | 8/2022 | Lin et al. |

FOREIGN PATENT DOCUMENTS

| | | |
|---|---|---|
| CN | 102195822 A | 9/2011 |
| CN | 106487675 A | 3/2017 |
| CN | 106878166 A1 | 6/2017 |
| CN | 107135133 A | 9/2017 |
| CN | 107276784 A | 10/2017 |
| CN | 107409083 A1 | 11/2017 |
| CN | 108880970 A | 11/2018 |
| CN | 110391951 A | 10/2019 |
| CN | 106161253 B | 12/2020 |
| EP | 3641240 A1 | 4/2020 |
| WO | 20170118880 A1 | 7/2017 |
| WO | 2018047943 A1 | 3/2018 |

OTHER PUBLICATIONS

Mahalingam et al., "Virtual extensible Local Area Network (VXLAN): A Framework for Overlaying Virtualized Layer 2 Networks over Layer 3 Networks," RFC 7348, Independent Submission, Aug. 2014, 23 pp.

Notice of Allowance from U.S. Appl. No. 17/301,351 dated Aug. 30, 2022, 10 pp.

Notice of Allowance from U.S. Appl. No. 17/301,351, dated May 18, 2022, 11 pp.

Patel et al., "The BGP Tunnel Encapsulation Attribute", Internet-Draft, retrieved from draft-ietf-idr-tunnel-encaps-22, Jan. 7, 2021, 47 pp.

Rosen, et al., "IANA Registries for BGP Extended Communities," Internet Engineering Task Force, RFC 7153, Mar. 2014, 16 pp.

Sajassi et al, "BGP MPLS-Based Ethernet VPN," RFC 7432, Internet Engineering Task Force (IETF), Feb. 2015, 56 pp.

Sajassi et al., "A Network Virtualization Overlay Solution using EVPN: draft-ietf-bess-evpn-overlay-12", Internet-Draft: Bess Workshop, Internet Engineering Task Force, IETF: Standard Working Draft, Internet Society (ISOC) 4, Rue Des Falaises, CH, 1205, Geneva, Switz, No. 12, Feb. 9, 2019, pp. 1-31, XP015125631.

Sajassi et al., "BGP MPLS-Based Ethernet VPN; draft-ietf-bess-rfc7432bis-00.txt," Bess Working Group; Internet-Draft, Dec. 21, 2020, 65 pp.

U.S. Appl. No. 18/146,309, filed Dec. 23, 2022, naming inventors Lin et al.

Response to Extended Search Report dated Nov. 18, 2021, from counterpart European Application No. 21180926.4 filed Apr. 4, 2023, 52 pp.

Wen-Sheng et al., "Design and Implementation of VPWS Redundant Backup Based on MPLS L2VPN Technology", vol. 19, No. 11, Mar. 16, 2010, pp. 185-189, Translation provided for only the Abstract.

First Office Action and Search Report, and translation thereof, from counterpart Chinese Application No. 202110692300.0 dated Sep. 13, 2023, 9 pp.

Huajing et al., "Implementation of redundant routing in MPLS VPN based on DVSR and GRE", vol. 6, China Academic Journal Electronic Publishing House, Shanghai, China, Jun. 25, 2005, 4 pp., Machine translation provided for only the Abstract.

Sheng, "Application of VXLAN Technology in Data Center", China Academic Journal Electronic Publishing House, Aug. 20, 2018, 4 pp., Translation not provided.

Singh et al., "VXLAN and EVPN for Data Center Network Transformation", 2017 8th International Conference on Computing, Communication and Networking Technologies (ICCCNT), IEEE, Dehli India, Jul. 3, 2017, 6 pp.

FAST REROUTE FOR ETHERNET VIRTUAL PRIVATE NETWORKS—VIRTUAL EXTENSIBLE LOCAL AREA NETWORK

This application is a continuation of U.S. patent application Ser. No. 17/301,351, filed 31 Mar. 2021, the entire contents of which is incorporated herein by reference.

TECHNICAL FIELD

The disclosure relates to computer networks and, more particularly, to forwarding traffic within computer networks.

BACKGROUND

A computer network is a collection of interconnected computing devices that can exchange data and share resources. Example network devices include switches or other layer two ("L2") devices that operate within the second layer of the Open Systems Interconnection ("OSI") reference model, i.e., the data link layer, and routers or other layer three ("L3") devices that operate within the third layer of the OSI reference model, i.e., the network layer. Network devices within computer networks often include a control unit that provides control plane functionality for the network device and forwarding units for routing or switching data units.

An Ethernet Virtual Private Network ("EVPN") may be used to extend two or more remote L2 customer networks through an intermediate L3 network (usually referred to as a "provider network" or "core network"), in a transparent manner, i.e., as if the intermediate L3 network does not exist. In particular, the EVPN transports L2 communications, such as Ethernet packets or "frames," between customer networks connected by an IP infrastructure in which case IP/GRE tunneling or other IP tunneling can be used within the provider network to carry encapsulated L2 communications as if these customer networks were directly attached to the same local area network ("LAN").

In an EVPN configuration, a customer edge ("CE") device of a customer network is said to be multi-homed when it is coupled to two or more physically different provider edge ("PE") devices on the same EVPN instance when the PE devices are resident on the same physical Ethernet segment. The PE devices on the Ethernet segment provide transport services through the intermediate network to a remote PE device, and each of the PE devices on the Ethernet segment may forward Ethernet frames in the Ethernet segment for the CE device. When a CE device is multi-homed to two or more PE devices, either one or all of the multi-homed PE devices are used to reach the customer network depending on the multi-homing mode of operation.

An example of an IP tunneling scheme is Virtual eXtensible Local Area Network ("VXLAN"). VXLAN provides a tunneling scheme to overlay L2 networks on top of L3 networks. VXLANs establish tunnels for communicating traffic over common physical IP infrastructure between the PE devices. That is, VXLAN overlay networks are designated for each customer network and operated over the existing LAN infrastructure of a data center, for example. Devices that support VXLANs are called virtual tunnel endpoints (VTEPs) (also known as "VXLAN tunnel endpoints"). VTEPs can be end hosts or network switches or routers. VTEPs encapsulate VXLAN traffic and de-encapsulate that traffic when it leaves the VXLAN tunnel. An EVPN implementing VXLAN is referred to herein as "EVPN-VXLAN."

SUMMARY

In general, techniques are described for facilitating fast reroute for traffic in EVPN-VXLAN. For example, network devices, e.g., PE devices, may use fast reroute to restore traffic flow in response to a node or link failure. Typically, a PE device may implement fast reroute by pre-installing in its data plane a backup path that leads to a backup network device for handling traffic. However, a first PE device ("primary PE device") of an Ethernet segment may be inhibited from establishing a backup path over the core network to a second PE device (e.g., "backup PE device") of the Ethernet segment due to an EVPN "split-horizon filtering" rule. For example, the split-horizon filtering rule prevents a network device from forwarding traffic that is received from a tunnel (e.g., VXLAN tunnel) of a given split-horizon group over the core network from being forwarded back into the core network on another tunnel belonging to the same split-horizon group.

In accordance with the techniques described in this disclosure, the backup PE device is configured with an additional tunnel endpoint address (referred to herein as "reroute tunnel endpoint address") for the backup path that is associated with a split-horizon group (referred to herein as "second split-horizon group") that is different than a tunnel endpoint address and first split-horizon group for another path used for normal traffic forwarding. The backup PE device sends the reroute tunnel endpoint address to the primary PE device. For example, the backup PE device may advertise an EVPN route including the reroute tunnel endpoint address, such as including the reroute tunnel endpoint address in an Egress Endpoint sub-type-length-value (sub-TLV) of a BGP tunnel encapsulation attribute carried in an Ethernet Auto-Discovery route (e.g., EVPN Type 1 route), and/or including the reroute tunnel endpoint address in an extended community (e.g., BGP transitive extended community) of an Ethernet AD route or MAC/IP Advertisement route (e.g., EVPN Type 2 route).

In response to receiving the reroute tunnel endpoint address, the primary PE device may use the reroute tunnel endpoint address to configure a backup path to the backup PE device over the core network. For example, a routing component of the primary PE device may configure a forwarding component of the primary PE device by installing the reroute tunnel endpoint address within the forwarding plane and one or more operations to cause the forwarding component to encapsulate a VXLAN header including the reroute tunnel endpoint address to a packet received from the core network when rerouting the packet back into the core network along the backup path to the backup PE device. In this way, when the primary PE device receives a packet over the core network and the access link from the primary PE device to the local CE device has failed, the primary PE device may reroute the packet back into the core network to the backup PE device, which in turn may forward the packet on the Ethernet segment to the local CE device.

The techniques may provide one or more technical advantages. For example, by configuring a backup PE device of the Ethernet segment with a reroute tunnel endpoint address associated with a second split-horizon group that is different than a tunnel endpoint address associated with a first split-horizon group for another path used for normal traffic forwarding and sending the reroute tunnel endpoint address to the primary PE device, the primary PE device may install a backup path using the reroute tunnel endpoint address to reroute packets to the backup PE device without being inhibited by the split-horizon filtering rule. In this way, the PE devices may provide fast reroute for traffic in EVPN-VXLAN, and thus provide faster convergence (e.g., sub-second convergence) in the event an egress access link failure occurs.

In one example, a method includes receiving, by a first provider edge (PE) device of an Ethernet segment and from a second PE device of the Ethernet segment that provides a customer edge (CE) device multi-homed to the first PE device and the second PE device with reachability to an Ethernet Virtual Private Network (EVPN) instance, a reroute tunnel endpoint address of the second PE device for a backup path to the second PE device, wherein the reroute tunnel endpoint address of the second PE device is associated with a second split-horizon group that is different than a tunnel endpoint address and a first split-horizon group of the second PE device for another path to the second PE device. The method also includes configuring, by a routing component of the first PE device and within a forwarding component of the first PE device, a backup path to the second PE device over a core network, wherein configuring the backup path comprises installing the reroute tunnel endpoint address within the forwarding component and one or more operations causing the forwarding component to encapsulate, to a packet received from the core network, a Virtualized eXtensible Local Area Network (VXLAN) header including the reroute tunnel endpoint address as a destination tunnel endpoint address of the VXLAN header. The method further includes receiving, by the forwarding component of first PE device, a packet from the core network. Moreover, the method includes rerouting, by the forwarding component of the first PE device and when an access link from the first PE device to the CE device has failed, the packet on the backup path by encapsulating the VXLAN header including the reroute tunnel endpoint address and forwarding the packet including the reroute tunnel endpoint address on the backup path to the second PE device over the core network.

In another example, a method includes configuring a first provider edge (PE) device of an Ethernet segment with a reroute tunnel endpoint for a backup path to the first PE device, wherein the Ethernet segment provides a customer edge (CE) device that is multi-homed to the first PE device and a second PE device with reachability to an Ethernet Virtual Private Network (EVPN) instance, and wherein the reroute tunnel endpoint address of the first PE device is associated with a second split-horizon group that is different than a tunnel endpoint address and a first split-horizon group of the first PE device for another path to the first PE device. The method also includes sending, by the first PE device, the reroute tunnel endpoint address to a second PE device. The method also includes receiving, by the first PE device, a packet encapsulated with a Virtualized eXtensible Local Area Network (VXLAN) header including the reroute tunnel endpoint address as a destination tunnel endpoint address of the VXLAN header. The method further includes sending, by the first PE device, the packet on the Ethernet segment to the CE device.

In yet another example, a first provider edge (PE) device of an Ethernet segment, comprises: a forwarding component; and a routing component configured to: receive, from a second PE device of the Ethernet segment, a reroute tunnel endpoint address of the second PE device for a backup path to the second PE device, wherein the Ethernet segment provides a customer edge (CE) device that is multi-homed to the first PE device and the second PE device with reachability to an Ethernet Virtual Private Network (EVPN) instance, and wherein the reroute tunnel endpoint address of the second PE device is associated with a second split-horizon group that is different than a tunnel endpoint address and a first split-horizon group of the second PE device for another path to the second PE device; and configure, within a forwarding component of the first PE device, a backup path to the second PE device over a core network, wherein configuring the backup path comprises installing the reroute tunnel endpoint address within the forwarding component and one or more operations causing the forwarding component to encapsulate, to a packet received from the core network, a Virtualized eXtensible Local Area Network (VXLAN) header including the reroute tunnel endpoint address as a destination tunnel endpoint address of the VXLAN header; and wherein, in response to the configuration of the backup path, the forwarding component is configured to: receive a packet from the core network; and reroute, when an access link from the first PE device to the CE device has failed, the packet on the backup path by encapsulating the VXLAN header including the reroute tunnel endpoint address and forwarding the packet including the reroute tunnel endpoint address on the backup path to the second PE device over the core network.

The details of one or more aspects of the techniques are set forth in the accompanying drawings and the description below. Other features, objects, and advantages of the techniques of this disclosure will be apparent from the description and drawings, and from the claims.

BRIEF DESCRIPTION OF DRAWINGS

Like reference characters denote like elements throughout the figures and text.

DETAILED DESCRIPTION

Figure 1:
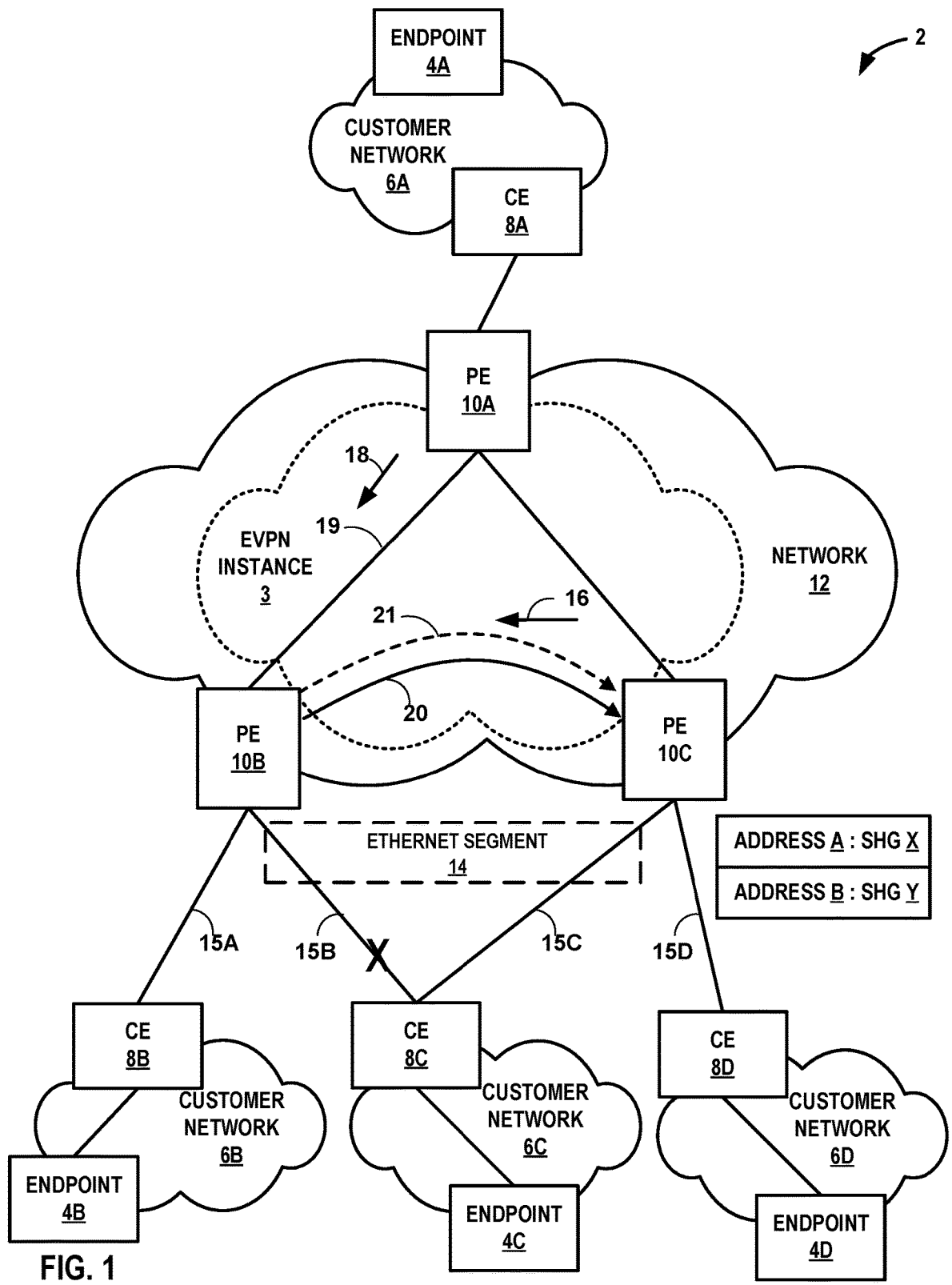
FIG. 1 is a block diagram illustrating a network system configured to provide fast reroute for traffic in EVPN-VXLAN, in accordance with one or more aspects of the techniques described in this disclosure.

FIG. 1 is a block diagram illustrating a network system 2 configured to provide fast reroute for traffic in EVPN-VXLAN, in accordance with one or more aspects of the techniques described in this disclosure. As shown in FIG. 1, network system 2 includes customer networks 6A-6D ("customer networks 6") connected to an intermediate network 12. Intermediate network 12 may represent a public network that is owned and operated by a service provider to interconnect a plurality of edge networks, such as customer networks 6. Intermediate network 12 is a layer 3 ("L3") network in the sense that it natively supports L3 operations as described in the OSI model. Common L3 operations include those performed in accordance with L3 protocols, such as the Internet protocol ("IP"). L3 is also known as a "network layer" in the OSI model and the "IP layer" in the TCP/IP model, and the term L3 may be used interchangeably with "network layer" and "IP" throughout this disclosure. As a result, intermediate network 12 may be referred to herein as a Service Provider ("SP") network or, alternatively, as a "core network" considering that network 12 acts as a core to interconnect edge networks, such as customer networks 6.

In the example of FIG. 1, provider edge network devices 10A-10C (collectively, "PE devices 10") provide customer endpoints 4A-4D (collectively, "endpoints 4") associated with customer networks 6 with access to intermediate network 12 via customer edge network devices, e.g., customer edge network devices 8A-8D (collectively, "CE devices 8"). PE devices 10 and CE devices 8 may each represent a router, switch, or other suitable network device that participates in an L2 virtual private network ("L2VPN") service, such as an EVPN. Each of endpoints 4 may represent one or more non-edge switches, routers, hubs, gateways, security devices such as firewalls, intrusion detection, and/or intrusion prevention devices, servers, computer terminals, laptops, tablets, printers, databases, wireless mobile devices such as cellular phones or personal digital assistants, wireless access points, bridges, cable modems, application accelerators, or other network devices.

The configuration of network system 2 illustrated in FIG. 1 is merely an example. For example, a network system may include any number of customer networks. Nonetheless, for ease of description, only customer networks 6A-6D are illustrated in FIG. 1. Although additional network devices are not shown for ease of explanation, it should be understood that network system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

Intermediate network 12 may provide a number of residential and business services, including residential and business class data services (which are often referred to as "Internet services" in that these data services permit access to the collection of publicly accessible networks referred to as the Internet), residential and business class telephone and/or voice services, and residential and business class television services. One such business class data service offered by a service provider intermediate network 12 includes layer 2 ("L2") EVPN service. Intermediate network 12 represents an L2/L3 switch fabric for one or more customer networks that may implement an L2 EVPN service. An EVPN is a service that provides a form of L2 connectivity across an intermediate L3 network, such as intermediate network 12, to interconnect two or more L2 customer networks, such as L2 customer networks 6, that may be located in different geographical areas (in the case of service provider network implementation) and/or in different racks (in the case of a data center implementation). In some examples, the EVPN transports L2 communications, such as Ethernet packets or "frames," between customer networks connected by an IP infrastructure in which case IP/GRE tunneling or other IP tunneling can be used within the provider network to carry encapsulated L2 communications as if these customer networks were directly attached to the same local area network ("LAN"). Often, EVPN is transparent to the customer networks in that these customer networks are not aware of the intervening intermediate network and instead act and operate as if these customer networks were directly connected and form a single L2 network, and for this reason, EVPN may also be referred to as a "transparent LAN service."

To configure an EVPN, a network operator of intermediate network 12 configures, via configuration or management interfaces, various devices, e.g., PE devices 10, included within intermediate network 12 that interface with L2 customer networks 6. The EVPN configuration may include an EVPN instance ("EVI") 3, which comprises of one or more broadcast domains. EVPN instance 3 is configured within intermediate network 12 for customer networks 6 to enable endpoints 4 within customer networks 6 to communicate with one another via the EVI as if endpoints 4 were directly connected via an L2 network. Generally, EVI 3 may be associated with a virtual routing and forwarding instance ("VRF") on a PE device, such as any of PE devices 10A-10C. Consequently, multiple EVIs (not shown) may be configured on PE devices 10A-10C for an Ethernet segment, e.g., Ethernet segment 14, each of the EVIs providing a separate, logical L2 forwarding domain. As used herein, an EVI is an EVPN routing and forwarding instance spanning PE devices 10A-10C participating in the EVI. In the example of FIG. 1, each of PE devices 10 is configured with EVI 3 and exchanges EVPN routes to implement EVI 3, as further described below.

Each of PE devices 10 uses MAC routes specifying the MAC addresses learned by other PE devices to determine how to forward L2 communications to MAC addresses that belong to devices connected to other PE devices, i.e., to remote CE devices 8 and/or devices behind CE devices operatively coupled to PE devices (e.g., endpoints 4). That is, each of PE devices 10 determine whether Ethernet frames can be sent directly to a particular one of the other CE devices, PE devices 10 or whether to treat the Ethernet frames as so called broadcast, unknown unicast, or multicast ("BUM") traffic that is to be flooded within the EVPN based on the MAC addresses learning information received from the other PE devices 10.

An example of an IP tunneling scheme is Virtual eXtensible Local Area Network ("VXLAN"). VXLANs provide an IP tunneling scheme to overlay L2 networks, e.g., customer networks 6, on top of L3 networks, e.g., intermediate network 12. VXLANs establish tunnels for communicating traffic over common physical IP infrastructure between Network Virtualization Edges/VXLAN Tunneling Endpoints (VTEPs), e.g., PE devices 10. That is, VXLAN creates virtual L2 networks spanning physical L3 networks between VTEPs. For example, PE devices 10 operating as VTEPs may encapsulate VXLAN traffic and de-encapsulate that traffic when it leaves the VXLAN tunnel. As one example, VTEPs communicate traffic with a 24-bit segment ID, Virtual Network Identifier (VNI), that uniquely identifies the VXLAN. For instance, the VNI maps to a tenant Virtual Local Area Network (VLAN) identifier, where the tenant VLAN identifier gets mapped to an EVPN instance (EVI). To tunnel traffic, an ingress PE device may encapsulate an "outer packet" (referred to as "VXLAN header") with the VNI that identifies a corresponding VXLAN instance to tunnel the payload or "inner packet" over the EVPN. When an egress PE device receives the packet, the egress PE device de-encapsulates the VXLAN header and forwards the L2 communications to its local customer network. In a way, VXLAN "stretches" an L2 network over an intermediate L3 network. Additional examples of VXLAN are described in "Virtual eXtensible Local Area Network (VXLAN): A Framework for Overlaying Virtualized Layer 2 Networks over Layer 3 Networks," Request for Comments 7438, August 2014, the entire contents of which is incorporated by reference herein. PE devices 10 may implement other tunneling protocols, such as Network Virtualization using Generic Routing Encapsulation (NVGRE), Generic Routing Encapsulation (GRE), MPLS-over-GRE, User Datagram Protocol (UDP), or MPLS-over-UDP.

In the example of FIG. 1, PE device 10A may receive L2 traffic originating from customer network 6A and destined for customer network 6C, and encapsulate the L2 traffic from customer network 6A with a VXLAN header that identifies a corresponding VXLAN instance, e.g., VXLAN tunnel 19, and a destination VTEP, e.g., PE device 10B, to tunnel the traffic to PE device 10B, which in turn forwards the traffic to customer network 6C. Similarly, PE device 10B may receive L2 traffic originating from customer network 6B and destined for customer network 6D, and encapsulate the L2 traffic from customer network 6B with a VXLAN header that identifies a corresponding VXLAN instance, e.g., VXLAN tunnel 20, and a destination VTEP, e.g., PE device 10C, to tunnel the traffic to PE device 10C, which in turn forwards the traffic to customer network 6D.

In an EVPN configuration, a CE device is said to be multi-homed when it is coupled to two or more physically different PE devices on the same EVI when the PE devices are resident on the same physical Ethernet segment. For example, CE device 8C is coupled to PE devices 10B-10C via links 15B-15C, respectively, where PE devices 10B-10C are capable of providing L2 customer network 6C with redundant connectivity to EVPN via CE device 8C. Multi-homed devices are often employed by network operators so as to improve access to the EVPN provided by intermediate network 12 should a failure in one of egress PE devices 10B-10C or one of links 15B-15C occur. When a CE device is multi-homed to two or more PE devices, either one or all of the multi-homed PE devices are used to reach the customer network depending on the multi-homing mode of operation. In this example, PE devices 10B and 10C may operate in an all-active EVPN multi-homing mode. In the example of FIG. 1, CE devices 8B and 8D are each single-homed, i.e., CE device 8B is coupled to PE device 10B via link 15A and CE device 8D is coupled to PE device 10D via link 15D.

For each EVI, the EVPN protocol directs the PE devices to output a routing protocol message advertising an Ethernet Auto-Discovery (AD) route (e.g., EVPN Type 1 route) specifying the relevant Ethernet segment identifier (ESI) for the Ethernet segment coupled to the EVPN instance. That is, each of PE devices 10 may advertise an Ethernet AD route per Ethernet segment to advertise reachability of the Ethernet segment on the PE device. For example, each of PE devices 10 for each EVI may use a Border Gateway Protocol (BGP) to advertise an Ethernet AD route that includes an RD (which may include, e.g., an IP address of the originating PE device), ESI, Ethernet Tag Identifier, and MPLS label that identifies the Ethernet segment ("ESI label"). Each of the routes are advertised and imported by all multi-homed and remote PE devices that share the same EVI on the advertising ESI. In the example of FIG. 1, each of PE devices 10B-10D of EVI 3 advertise and import the routes described above to discover each other and to elect a designated forwarder for Ethernet segment 14.

In some examples, Ethernet Tags are used to identify a particular broadcast domain, e.g., a VLAN, in an EVI. A PE device may advertise a unique EVPN label per <Ethernet Segment Identifier (ESI), Ethernet Tag> combination. This label assignment methodology is referred to as a per <ESI, Ethernet Tag> label assignment. Alternatively, a PE device may advertise a unique EVPN label per media access control (MAC) address. In still another example, a PE device may advertise the same single EVPN label for all MAC addresses in a given EVI. This label assignment methodology is referred to as a per EVI label assignment.

Once the EVPN is operational for the {EVI, ESI} pair, PE devices 10 output a MAC/IP Advertisement route (e.g., EVPN Type 2 route) to other PE devices to announce media access control (MAC) addresses associated with customer equipment in their local customer network. For example, PE devices 10 output MAC/IP Advertisement routes including an RD, ESI, Ethernet Tag Identifier, MAC address and MAC address length, IP network address and IP network address length, and MPLS label, for example. As one example, PE devices 10B and 10D each advertises a MAC/IP Advertisement route to other PE devices to announce the MAC address of CE device 8C and/or endpoint 4C in customer network 6C that is reachable by Ethernet segment 14. Additional information with respect to the EVPN protocol is described in "BGP MPLS-Based Ethernet VPN," Internet Engineering Task Force (IETF), RFC 7432, February 2015, the entire content of which is incorporated herein by reference.

In some examples, a PE device may use fast reroute (FRR) to reroute traffic in response to a link or node failure. To generally perform fast reroute, a primary PE device of an Ethernet segment pre-installs a backup path to reroute traffic to a backup PE device of the Ethernet segment and uses the backup path in the event of a link or node failure. Without the techniques described in this disclosure, a primary PE device is unable to establish a backup path, e.g., VXLAN tunnel, to a backup PE device of the Ethernet segment due to a "split-horizon filtering" rule. For example, the split-horizon filtering rule prevents traffic from being forwarded back to the source (e.g., receiving a packet from the core network and sending the packet back into the core network). To achieve split-horizon filtering, VXLAN tunnels are typically associated with the same split-horizon group. For example, as VXLAN tunnel 19 and VXLAN tunnel 20 are added to a bridge domain, the VXLAN tunnels are typically configured with the same split-horizon group. Traffic that is received from a tunnel of a given split-horizon group is not forwarded to another tunnel of the same split-horizon group. In this example, because VXLAN tunnels 19 and 20 belong to the same split-horizon group, PE device 10B is unable to send traffic that it receives from intermediate network 12 via VXLAN tunnel 19 back into intermediate network 12 to backup PE device 10C via VXLAN tunnel 20.

In accordance with the techniques described in this disclosure, PE devices of the Ethernet segment may provide fast reroute for traffic in EVPN-VXLAN. In this example, the backup PE device (e.g., PE device 10C) and primary PE device (e.g., PE device 10B) may operate in an all-active EVPN multihoming mode. PE device 10C (the backup PE device for Ethernet segment 14), is configured with an additional tunnel endpoint address (referred to herein as "reroute tunnel endpoint address") for a backup path, where the reroute tunnel endpoint address is different than a tunnel endpoint address for another path to PE device 10C used for "normal traffic forwarding," e.g., for traffic forwarded on VXLAN tunnel 20. For example, to send traffic from CE device 8B to CE device 8D, PE device 10B may use VXLAN tunnel 20 to tunnel traffic received from CE device 8B to PE device 10C. In this example, PE device 10C is configured with a tunnel endpoint address "A" for VXLAN tunnel 20 associated with a first split-horizon group "X" for forwarding traffic on VXLAN tunnel 20 (illustrated in FIG. 1 as "ADDRESS A:SHG X"). Other paths, e.g., VXLAN tunnel 19, are also associated with the first split-horizon group "X" such that the split-horizon filtering rule is applied. In this example, PE device 10C is also configured with a reroute tunnel endpoint address "B" for VXLAN tunnel 21 (e.g., the backup path) associated with a second split-horizon group "Y" for forwarding traffic on the backup path (illustrated in FIG. 1 as "ADDRESS B:SHG Y"). The reroute tunnel endpoint address and second split-horizon group for VXLAN tunnel 21 are different than the tunnel endpoint address and first split-horizon group for VXLAN tunnel 20.

PE device 10C may send the reroute tunnel endpoint address to the primary PE device, e.g., PE device 10B. As one example, PE device 10C may advertise an Ethernet Auto-Discovery (AD) route including the reroute tunnel endpoint address (illustrated as "route 16" in FIG. 1). As further described below, PE device 10C may advertise the reroute tunnel endpoint address in a Tunnel Egress Endpoint sub-type-length-value (sub-TLV) of a BGP tunnel encapsulation attribute that is carried in an Ethernet AD route, for example. Additional examples of the Tunnel Egress Endpoint sub-TLV is described in K. Patel, et al., "The BGP Tunnel Encapsulation Attribute," Internet-Draft, draft-ietf-idr-tunnel-encaps-22, Jan. 7, 2021, the entire contents of which is incorporated by reference herein. Route 16 may set the ESI value to zero and include a route target of the EVI 3 for Ethernet segment 14 (and other route targets of other EVPN instances for Ethernet segment 14). As another example, PE device 10C may advertise the reroute tunnel endpoint address (e.g., an IPv4 or IPv6 address) in an extended community (e.g., BGP Transitive Extended Community (type 0x06)) for an Ethernet AD route (e.g., EVPN Type 1 route) or MAC/IP advertisement route (e.g., EVPN Type 2 route), as further described below.

In response to receiving the reroute tunnel endpoint address from PE device 10C, PE device 10B, e.g., the primary PE device, may use the reroute tunnel endpoint address to configure the backup path (e.g., VXLAN tunnel 21) over the core network to PE device 10C. For example, a routing component of PE device 10B may configure its forwarding component by installing, within the forwarding plane, the reroute tunnel endpoint address and configure one or more operations to cause the forwarding component to add the reroute tunnel endpoint address to a packet received from the core network and destined for CE device 8C when rerouting the packet back into the core network along the backup path (e.g., VXLAN tunnel 21) to PE device 10C. For example, the one or more operations may cause the forwarding component to encapsulate a VXLAN header including the reroute tunnel endpoint address as a destination VTEP of the VXLAN header to tunnel the packet to PE device 10C via VXLAN tunnel 21.

In some examples, PE device 10B may implement a Bidirectional Forwarding Detection (BFD) protocol to detect whether access link 15B has failed. Examples of BFD may include session-BFD (S-BFD) or Multihop-BFD (MH-BFD). PE device 10B may determine that access link 15B has failed based on determining that BFD messages have not been received from CE device 8C in a configured time period, for example. PE device 10B may also detect whether an Ethernet interface or aggregate Ethernet interface has failed using an Ethernet failure detection mechanism (e.g., link fault signaling (LFS)) at the physical layer without using BFD.

If there is no link failure (e.g., access link 15B is operating normally), PE device 10B forwards the traffic that it receives from intermediate network 12 on Ethernet segment 14 to CE device 8C using a primary path (e.g., a primary next hop). For example, PE device 10B may have a primary path configured with a next hop to CE device 8C via an interface to access link 15B.

In response to determining that access link 15B (or an Ethernet interface or aggregate Ethernet interface) has failed, PE device 10B may configure its forwarding component to use the backup path to reroute traffic on VXLAN tunnel 21. In this way, when PE device 10B receives packet 18 from intermediate network 12 via VXLAN tunnel 19 associated with the first split-horizon group "X", the forwarding component of PE device 10B may automatically perform operations to encapsulate a VXLAN header with the reroute tunnel endpoint associated with the second split-horizon group "Y" as a destination VTEP address of the VXLAN header, and send the packet including the reroute tunnel endpoint address to PE device 10C over intermediate network 12 via VXLAN tunnel 21. Because the tunnel endpoint address for VXLAN tunnel 21 is configured with a different split-horizon group than the tunnel endpoint address for VXLAN tunnel 19, the split-horizon filtering rule does not prevent PE device 10B from forwarding the packet over the core network to PE device 10C via VXLAN tunnel 21. PE device 10C receives the packet, and because PE device 10C is the tunnel endpoint for VXLAN tunnel 21, de-encapsulates the VXLAN header from the packet and forwards the payload on Ethernet segment 14 to CE device 8C.

For ease of illustration, the example of FIG. 1 is described with respect to configuring a single reroute tunnel endpoint address for a single backup path (e.g., VXLAN tunnel 21). The techniques may also include configuring an additional reroute tunnel endpoint address for each of a plurality of backup paths. For example, PE device 10A may load balance the traffic that is to be delivered to customer network 6C across PE devices 10B and 10C. In this example, if PE device 10C is the primary PE device and PE device 10B is the backup PE device, PE device 10B is configured with an additional tunnel endpoint address (e.g., reroute tunnel endpoint address) for a backup path from PE device 10C to PE device 10B (not shown in FIG. 1), where the reroute tunnel endpoint address for PE device 10B is different than a tunnel endpoint address used for forwarding traffic on a primary path. PE device 10B may send the tunnel endpoint addresses to PE device 10C such that PE device 10C, e.g., the primary PE device in this example, may use the reroute tunnel endpoint address associated with PE device 10B to configure the backup path over the core network to PE device 10B.

Figure 2:
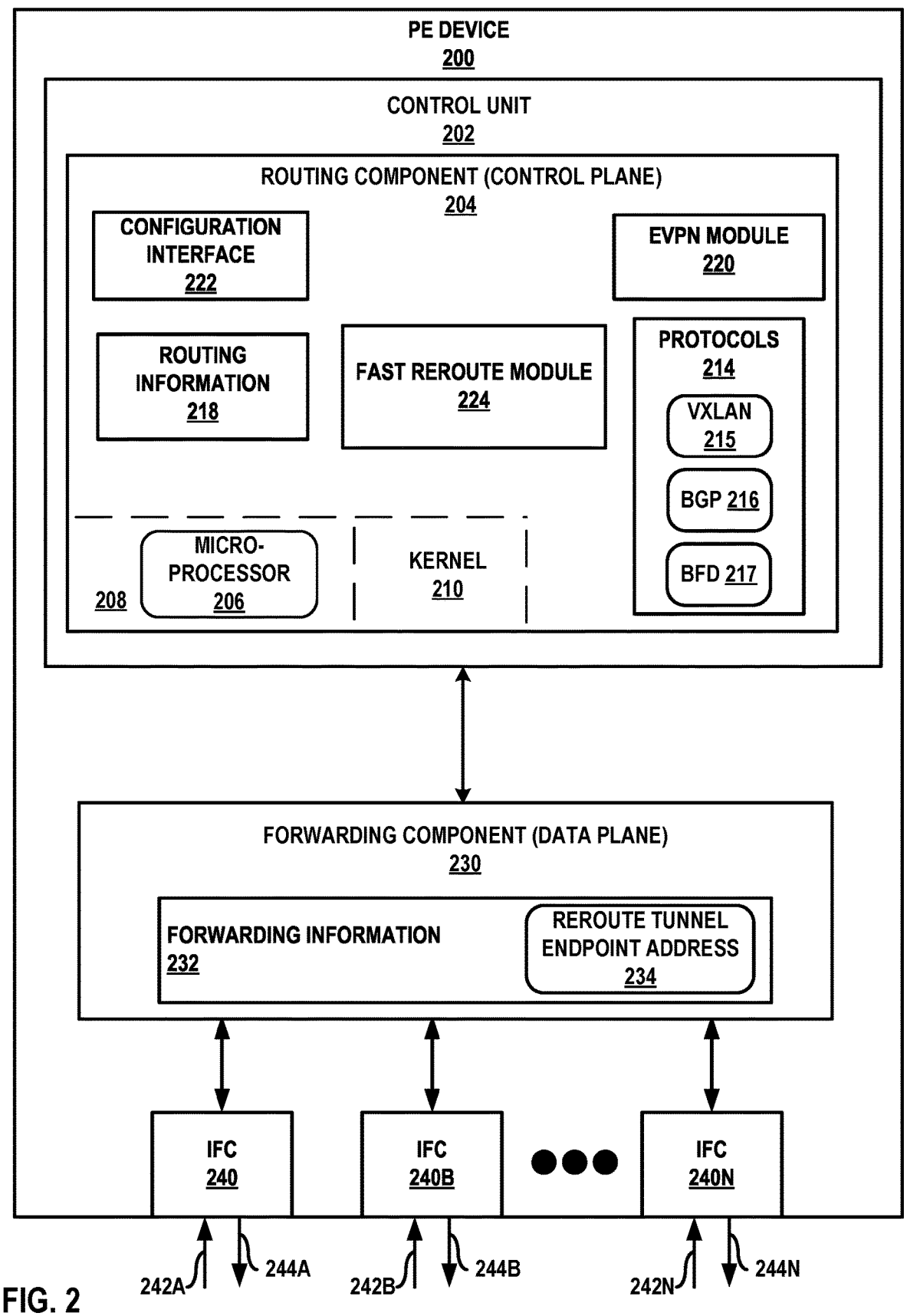
FIG. 2 is a block diagram illustrating an example of a provider edge device configured to provide fast reroute for traffic in EVPN-VXLAN, in accordance to one or more aspects of the techniques described in this disclosure.

FIG. 2 is a block diagram illustrating an example of a provider edge device configured to provide fast reroute for EVPN-VXLAN, in accordance to one or more aspects of the techniques described is this disclosure. PE device 200 is described with respect to PE devices 10B and 10C of FIG. 1, but may be performed by any PE device.

As shown in FIG. 2, PE device 200 includes a control unit 202 having a routing component 204 (control plane), and control unit 202 that is coupled to forwarding component 230 (data plane). Forwarding component 230 is associated with one or more interface cards 240A-240N ("IFCs 240") that receive packets via inbound links 242A-242N ("inbound links 242") and send packets via outbound links 244A-244N ("outbound links 244"). IFCs 240 are typically coupled to links 242, 244 via a number of interface ports (not shown). Inbound links 242 and outbound links 244 may represent physical interfaces, logical interfaces, or some combination thereof.

Elements of control unit 202 and forwarding component 230 may be implemented solely in software, or hardware, or may be implemented as combinations of software, hardware, or firmware. For example, control unit 202 may include one or more processors 206 that may represent, one or more microprocessors, digital signal processors ("DSPs"), application specific integrated circuits ("ASICs"), field programmable gate arrays ("FPGAs"), or any other equivalent integrated or discrete logic circuitry, or any combination thereof, which execute software instructions. In that case, the various software modules of control unit 202 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory ("RAM"), read only memory ("ROM"), programmable read only memory (PROM), erasable programmable read only memory ("EPROM"), electronically erasable programmable read only memory ("EEPROM"), non-volatile random access memory ("NVRAM"), flash memory, a hard disk, a CD-ROM, a floppy disk, a cassette, a solid state drive, magnetic media, optical media, or other computer-readable media. Computer-readable media may be encoded with instructions corresponding to various aspects of PE device 200, e.g., protocols, processes, and modules. Control unit 202, in some examples, retrieves and executes the instructions from memory (not shown) for these aspects.

Routing component 204 operates as a control plane for PE device 200 and includes an operating system that provides a multi-tasking operating environment for execution of a number of concurrent processes. Routing component 204 includes a kernel 210, which provides a run-time operating environment for user-level processes. Kernel 210 may represent, for example, a UNIX operating system derivative such as Linux or Berkeley Software Distribution ("BSD"). Kernel 210 offers libraries and drivers by which user-level processes may interact with the underlying system. Hardware environment 208 of routing component 204 includes processor 206, described above, that executes program instructions loaded into a main memory (not shown in FIG. 2) from a storage device (also not shown in FIG. 2) in order to execute the software stack, including both kernel 210 and processes executing on the operating environment provided by kernel 210.

Kernel 210 provides an operating environment that executes various protocols 214 at different layers of a network stack, including protocols for implementing EVPN networks. For example, routing component 204 includes network protocols that operate at a network layer of the network stack. Protocols 214 provide control plane functions for storing network topology in the form of routing tables or other structures, executing routing protocols to communicate with peer routing devices and maintain and update the routing tables, and provide management interface(s) to allow user access and configuration of PE device 200. That is, routing component 204 is responsible for the maintenance of routing information 218 to reflect the current topology of a network and other network entities to which PE device 200 is connected. In particular, routing protocols are used to periodically update routing information 218 to reflect the current topology of the network and other entities based on routing protocol messages received by PE device 200.

In the example of FIG. 2, protocols 214 include routing protocols, such as Border Gateway Protocol ("BGP") 216 for exchanging routing information with other routing devices and for updating routing information 218. In EVPN, PE device 200 may use BGP to advertise to other PE devices the MAC addresses PE device 200 has learned from local customer edge network devices to which PE device 200 is connected. In particular, PE device 200 may use a BGP route advertisement message to announce reachability information for the EVPN, where the BGP route advertisement specifies one or more MAC addresses learned by PE device 200 instead of L3 routing information. PE device 200 updates routing information 218 based on the BGP route advertisement message. Protocols 214 may also include failure detection protocols, such as Bidirectional Forwarding Detection ("BFD") protocol 217 for exchanging BFD messages to detect node failure. In some examples, BFD protocol 217 may include seamless-BFD (S-BFD) or multihop-BFD (MH-BFD).

Protocols 214 may also include tunneling protocols, such as Virtual eXtensible LAN (VXLAN) 215, or other tunneling protocols not shown in FIG. 2, such as NVGRE, GRE, UDP and/or MPLS tunneling protocols.

Routing information 218 may include information defining a topology of a network, including one or more routing tables and/or link-state databases. Typically, the routing information defines routes (i.e., series of next hops) through a network to destinations/prefixes within the network learned via a distance-vector routing protocol (e.g., BGP) or defines the network topology with interconnected links learned using a link state routing protocol (e.g., IS-IS or OSPF). In contrast, forwarding information 232 is generated based on selection of certain routes within the network and maps packet key information (e.g., L2/L3 source and destination addresses and other select information from a packet header) to one or more specific next hop forwarding structures within forwarding information 232 and ultimately to one or more specific output interface ports of IFCs 240. Routing component 204 may generate forwarding information 232 in the form of a radix tree having leaf nodes that represent destinations within the network, a series of tables, a link list, a database, a flat file, or various other data structures.

Routing component 204 also includes an EVPN module 220 that performs L2 learning using BGP 216. EVPN module 220 may maintain tables for each EVI established by PE device 200, or in alternative examples may maintain one or more tables that are independent of each respective EVI. PE device 200 may use EVPN module 220 to advertise, e.g., EVPN routes including Ethernet AD routes (Type 1) to advertise reachability of PE device 200 for an Ethernet segment and Ethernet segment routes (Type 4) to discover other PE devices of the Ethernet segment and for purposes of DF election (and backup DF election) for the Ethernet segment. PE device 200 may use EVPN module 220 to advertise other EVPN routes, such as inclusive multicast Ethernet Tag (IMET) routes (Type 3) to advertise information about PE device 200 that is used to send BUM traffic to PE device 200. EVPN module 220 may store information from the routes, such as the identification of PE devices of an Ethernet segment and additional information provided by attributes and/or extended communities of the EVPN routes. Information may include, for example, one or more reroute tunnel endpoint addresses for backup paths (e.g., VXLAN tunnels), as further described below.

Routing component 204 includes a configuration interface 222 that receives and may report configuration data for PE device 200. Configuration interface 222 may represent a command line interface; a graphical user interface; Simple Network Management Protocol ("SNMP"), Netconf, or another configuration protocol; or some combination of the above in some examples. Configuration interface 222 receives configuration data configuring the PE device 200, and other constructs that at least partially define the operations for PE device 200, including the techniques described herein. For example, an administrator may, after powering-up, activating or otherwise enabling PE device 200 to operate within a network, interact with control unit 202 via configuration interface 222 to configure PE device 200 to perform the techniques described in this disclosure.

Forwarding component 230 represents hardware and logic functions that provide high-speed forwarding of network traffic. Forwarding component 230 implements data plane (also known as a "forwarding plane") functionality to handle packet processing from ingress interfaces on which packets are received to egress interfaces to which packets are sent. Forwarding component 230 determines data packet forwarding through PE device 200, applies services, rate limits packet flows, filters packets, and otherwise processes the packets using forwarding structures and lookup data installed by routing component 204 to the forwarding component 230.

Forwarding component 230 binds actions to be performed on packets received by the forwarding component to identification of one or more properties of the packets. That is, upon identifying certain packet properties, forwarding component 230 performs the action abound to the properties. Packet properties may include packet metadata such as a particular packet's ingress interface or egress interface (as determined by the forwarding component) as well as information carried by the packet and packet header, such as packet header fields, destination route prefixes, layer four (L4) or Transport Layer protocol destination ports, and the packet payload. Actions bound to packet characteristics may include count, discard, forward to a specified next-hop or interface, filter, sample, rate limit, and Quality of Service (QoS) marking, differential services (DiffServ), load balance, intrusion detection and prevention, L2 class of service (CoS), and L2 or L2 Virtual Private Network (L2VPN) switching.

Forwarding component 230 typically includes a set of one or more forwarding chips programmed with forwarding information (e.g., forwarding information 232) that maps network destinations with specific next hops and the corresponding output interface ports. For example, forwarding component 230 may include one or more programmable application-specific integrated circuits (ASIC)-based packet processors (not shown) that process packets to identify packet properties and perform actions bound to the properties. The ASIC-based packet processors include key engines that execute microcode (or "microinstructions") to control and apply fixed hardware components of the ASICs to process packet "keys." A packet key includes packet fields and other parameters that determine a flow of packet processing for the packet along an internal forwarding path. A forwarding path comprises programmable, executable microcode and fixed hardware components that determine the packet processing actions and other operations performed by the key engines. The forwarding path may include, for example, executable instructions, programmable logic, and application-specific logic that perform lookups, rate limit packet flows, and manipulate packet keys, among other functions.

In general, when PE device 200 receives a packet via one of inbound links 242, forwarding component 230 identifies an associated next hop for the data packet by traversing the programmed forwarding information based on information within the packet, e.g., in the case of a packet with VXLAN encapsulation, the VXLAN header. Forwarding component 230 forwards the packet on one of outbound links 244 mapped to the corresponding next hop.

Forwarding component 230 stores forwarding information 232 for each Ethernet VPN Instance (EVI) established by PE device 200 to associate network destinations with specific next hops and the corresponding interface ports. Forwarding unit 230 forwards the data packet on one of outbound links 244 to the corresponding next hop in accordance with forwarding information 232 associated with an Ethernet segment. At this time, forwarding component 230 may encapsulate and/or de-encapsulate packet headers (or push and/or pop labels in the case of MPLS) from the packet to forward the packet to the next hop. For example, if PE device 200 is to send a packet to a peer tunneling endpoint over the intermediate network, forwarding component 230 may encapsulate an outer tunnel transport header, e.g., an outer Ethernet header, outer IP header, outer tunnel scheme header, outer VXLAN header, inner destination MAC address, and inner source MAC address. If PE device 200 receives an encapsulated packet, forwarding component 230 may de-encapsulate the outer tunnel transport header and send the inner payload to the destination in accordance with forwarding information 232. Additional information regarding next hops is described in PLATFORM-INDEPENDENT CONTROL PLANE AND LOWER-LEVEL DERIVATION OF FORWARDING STRUCTURES, U.S. Pat. No. 7,990,993, filed Nov. 6, 2008, and additional information regarding the configuration of forwarding paths within the forwarding component is described in PACKET FORWARDING PATH PROGRAMMING USING HIGH-LEVEL DESCRIPTION LANGUAGE," U.S. Pat. No. 8,806,058, filed Jul. 29, 2011, the entire contents of each of which is incorporated by reference herein.

In accordance with the techniques described herein, routing component 204 may include a fast reroute module 224 that performs the techniques described in this disclosure. For example, PE device 200 may represent an example of a backup PE device (e.g., PE device 10C of FIG. 1). In this example, an administrator may configure PE device 200 via configuration interface 222 with a reroute tunnel endpoint address associated with a second split-horizon group for the backup path, where the reroute tunnel endpoint address and second split-horizon group are different than a tunnel endpoint address and first split-horizon group for another path used for normal traffic forwarding (e.g., VXLAN tunnel 20 of FIG. 1). For example, PE device 200 may be configured with a tunnel endpoint address and a first split-horizon group for a VXLAN tunnel 20 (e.g., "Address A:SHG X") and a different tunnel endpoint address and second split-horizon group for backup path VXLAN tunnel 21 (e.g., "Address B:SHG Y").

PE device 200 may use BGP 216 to advertise an EVPN route including the reroute tunnel endpoint address. For example, fast reroute module 224 may cause PE device 200 to include the reroute tunnel endpoint address in a Tunnel Egress Endpoint sub-TLV of a BGP Tunnel Encapsulation Attribute carried in an Ethernet AD route. As another example, fast reroute module 224 may cause PE device 200 to include the reroute tunnel endpoint address within a BGP Transitive Extended Community (type 0x06) carried in an Ethernet AD route or an EVPN MAC/IP Advertisement route (e.g., EVPN Type 2 route). PE device 200 may then advertise the EVPN route including the reroute tunnel endpoint address to the primary PE device.

In examples in which PE device 200 represents a primary PE device (e.g., PE device 10B of FIG. 1), PE device 200 may receive the EVPN route including the reroute tunnel endpoint address associated with the backup PE device. In response, fast reroute module 224 of PE device 200 may install the reroute tunnel endpoint address within forwarding information 232 (e.g., illustrated as "reroute tunnel endpoint address 234" in FIG. 2) and further configures forwarding component 230 with one or more operations to cause forwarding component 230 to encapsulate a VXLAN header to an incoming packet received from the core network, where the reroute tunnel endpoint address is set as a destination VTEP address of the VXLAN header to tunnel the packet to the backup PE device via the backup path (e.g., VXLAN tunnel 21).

In this way, when PE device 200 receives, via one of inbound links 242 of a core-facing interface and an access link to a locally connected CE device is down, the forwarding component 230 may, according to the forwarding information 232, encapsulate the packet with the reroute tunnel endpoint address and send the packet including the reroute tunnel endpoint address to the backup PE device via a core-facing interface to the backup path.

Figure 3A:
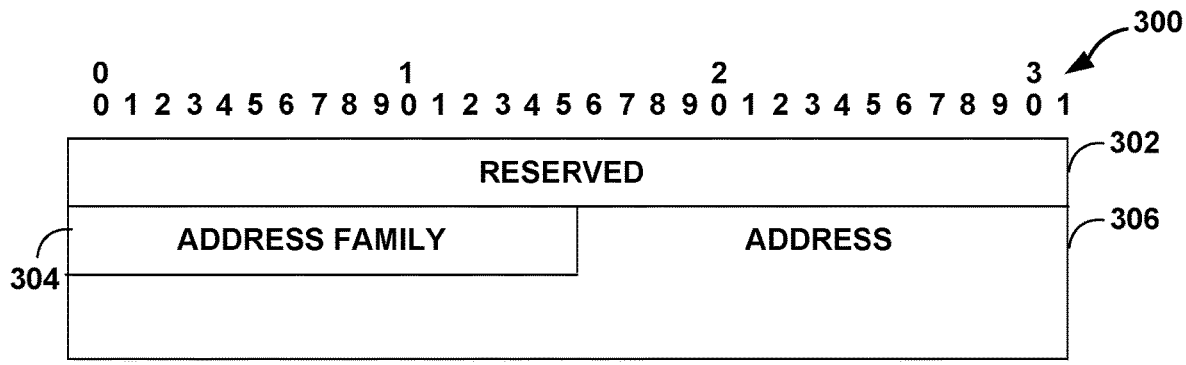
FIGS. 3A-3C are block diagrams illustrating example packet fields of a route including the reroute tunnel endpoint address, in accordance with one or more aspects of the techniques described in this disclosure.
Figure 3B:
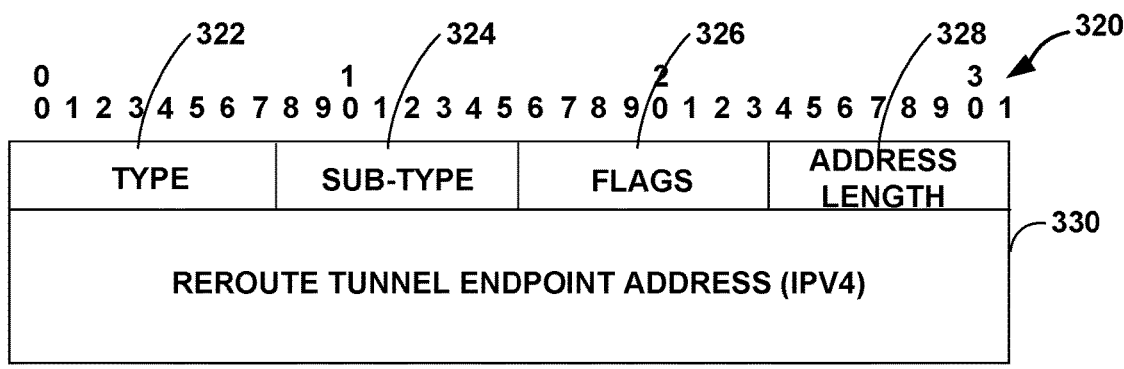
Figure 3C:
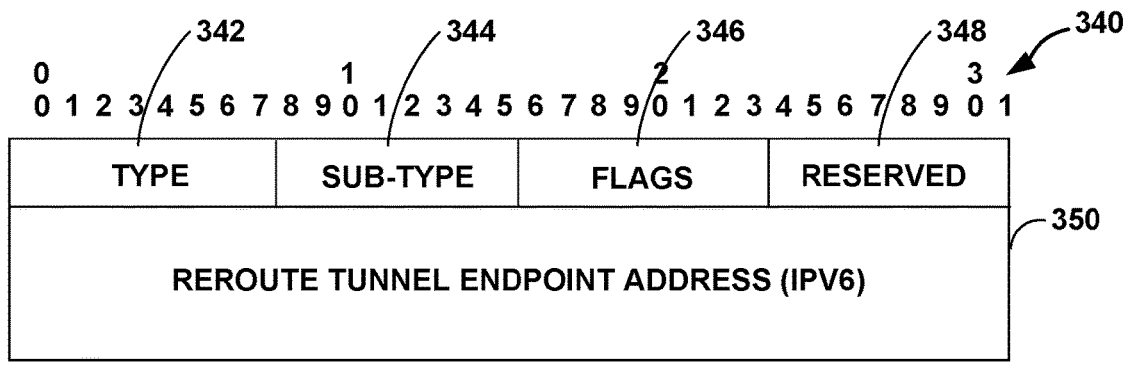

FIGS. 3A-3C are block diagrams illustrating example packet fields of a route including the reroute tunnel endpoint address, in accordance with one or more aspects of the techniques described in this disclosure.

FIG. 3A is a block diagram illustrating an example Egress Endpoint sub-TLV 300 of a BGP Tunnel Encapsulation Attribute. A BGP Tunnel Encapsulation Attribute is a Type-Length-Value (TLV) that specifies the type of tunnel (e.g., type 0x06 for VXLAN), a length of the value field, and one or more attributes specified in sub-TLVs, such as Egress Endpoint sub-TLV 300.

Egress Endpoint sub-TLV 300 is used to specify the address of the egress endpoint of the tunnel. For example, Egress Endpoint sub-TLV 300 includes a reserved field 302, an address family field 304, and an address field 306. The address family field 304 may specify a value from an "Address Family Numbers" registry of the Internet Assigned Numbers Authority (IANA). The value specified in the address family field 304 may indicate whether the address specified in address field 306 is an IPv4 or IPv6 address.

The address field 306 may specify the reroute tunnel endpoint address, as described in this disclosure. The reroute tunnel endpoint address may be an IPv4 address or an IPv6 address. In some examples, reserved field 302 may include a flags field with a bit to specify whether the reroute tunnel endpoint address is used when protecting egress link failures (e.g., access link 15B failures) or other scenarios in which the primary PE device is unable to send traffic to the local CE device (e.g., when the MAC address of the primary PE device is being updated). Additional examples of the Tunnel Egress Endpoint sub-TLV field is described in Internet-Draft, draft-ietf-idr-tunnel-encaps-22, which is incorporated by reference above.

FIG. 3B is a block diagram illustrating an example BGP transitive extended community 320 that includes an IPv4 reroute tunnel endpoint address, in accordance with one or more aspects of the techniques described in this disclosure. In this example, BGP transitive extended community 320 includes a type field 322, a sub-type field 324, a flags field 326, an address length field 328, and a reroute tunnel endpoint address field 330.

The type field 322 specifies the type as EVPN (e.g., type 0x06). The sub-type field 324 may specify a value (e.g., a value registered with the IANA) associated with the reroute tunnel endpoint address to indicate the BGP transitive extended community 320 includes a reroute tunnel endpoint address. The flags field 326 may specify whether the reroute tunnel endpoint address is used when protecting egress link failures (e.g., access link 15B failures) or other scenarios in which the primary PE device is unable to send traffic to the local CE device (e.g., when the MAC address of the primary PE device is being updated). The address length field 328 may specify the length of the reroute tunnel endpoint address. The reroute tunnel endpoint address field 330 may specify the reroute tunnel endpoint address, as described in this disclosure. In this example, the reroute tunnel endpoint address field 330 may include 4 or 16 octets to specify an IPv4 address of the reroute tunnel endpoint address.

FIG. 3C is a block diagram illustrating an example BGP transitive extended community 340 that includes an IPv6 reroute tunnel endpoint address, in accordance with one or more aspects of the techniques described in this disclosure. In this example, BGP transitive extended community 340 includes a type field 342, a sub-type field 344, a flags field 346, a reserved field 348, and a reroute tunnel endpoint address field 350.

The type field 342 specifies the type as EVPN (e.g., type 0x06). The sub-type field 344 may specify a value (e.g., a value registered with the IANA) associated with the reroute tunnel endpoint address to indicate the BGP transitive extended community 340 includes a reroute tunnel endpoint address. The flags field 346 may specify whether the reroute tunnel endpoint address is used when protecting egress link failures (e.g., access link 15B failures) or other scenarios in which the primary PE device is unable to send traffic to the local CE device (e.g., when the MAC address of the primary PE device is being updated). The reroute tunnel endpoint address field 350 may specify the reroute tunnel endpoint address, as described in this disclosure. In this example, the reroute tunnel endpoint address field 350 may include 128-bits to specify an IPv6 address of the reroute tunnel endpoint address. Additional examples of BGP transitive extended communities is described in E. Rosen, et al., "IANA Registries for BGP Extended Communities," Request for Comments 7153, March 2014, the entire contents of which is incorporated by reference herein.

Figure 4:
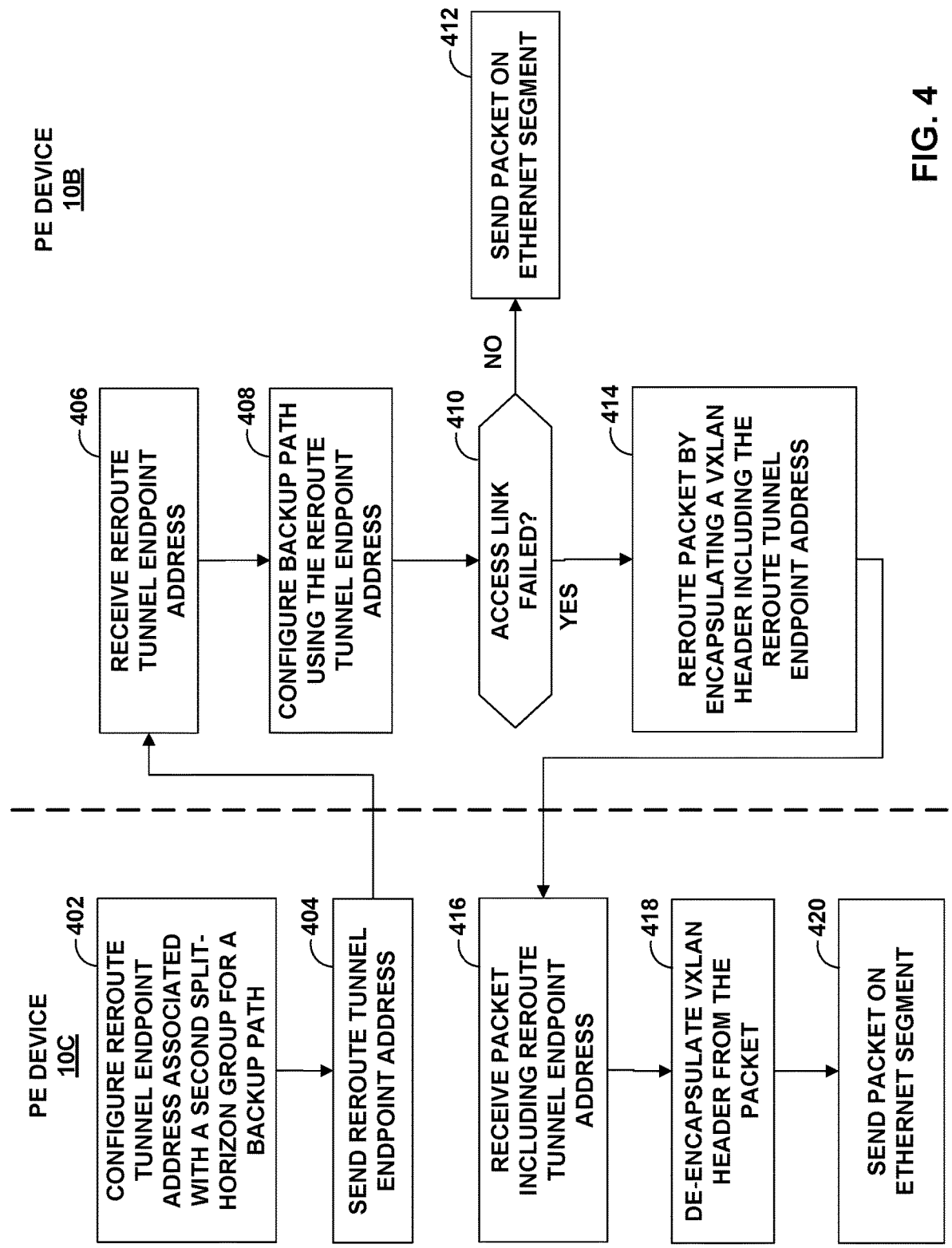
FIG. 4 is a flowchart illustrating an example operation of PE devices configured to provide fast reroute for traffic in EVPN-VXLAN, in accordance with one or more aspects of the techniques described in this disclosure.

FIG. 4 is a flowchart illustrating an example operation of PE devices, in accordance with one or more aspects of the techniques described in this disclosure. FIG. 4 will be described with respect PE devices 10 of FIG. 1 and PE device 200 of FIG. 2.

In the example of FIG. 4, PE device 10C of Ethernet segment 14 is configured with a reroute tunnel endpoint address associated with a second split-horizon group for a backup path, wherein the reroute tunnel endpoint address and second split-horizon group are different than the tunnel endpoint address and first split-horizon group of another path to PE device 10C used for normal traffic forwarding (402).

PE device 10C sends the reroute tunnel endpoint address to a primary PE device, e.g., PE device 10B (404). For example, PE device 10C may advertise an Ethernet AD route including the reroute tunnel endpoint address. As one example, PE device 10C may advertise the reroute tunnel endpoint address in a Tunnel Egress Endpoint sub-TLV of a BGP tunnel encapsulation attribute that is carried in an Ethernet AD route. As another example, PE device 10C may advertise the reroute tunnel endpoint address (e.g., an IPv4 or IPv6 address) in an extended community (e.g., BGP Transitive Extended Community (type 0x06)) of an EVPN AD route or EVPN MAC route (e.g., EVPN Type 2 route).

The primary PE device, e.g., PE device 10B receives the reroute tunnel endpoint address from PE device 10C (406) and may configure within its forwarding component 230 a backup path (e.g., backup next hop) to the backup PE device 10C over the core network (408). For example, fast reroute module 224 of the routing component 204 of PE device 10B may install the reroute tunnel endpoint address within the forwarding component 230 and one or more operations that causes the forwarding component 230 to encapsulate the packet with a VXLAN header with the reroute tunnel endpoint as a destination VTEP address of the VXLAN header to send the packet to PE device 10C over intermediate network 12 via the backup path, e.g., VXLAN tunnel 21.

PE device 10B may detect whether an access link to the CE device (e.g., access link 15B to CE device 8C) has failed (410). For example, PE device 10B may implement BFD protocol 317 to detect whether the access link has failed. If the access link has not failed ("NO" of step 410), PE device 10B sends a packet received from the core network using the primary path, e.g., sending the packet on Ethernet segment 14 to CE device 8C (412). If the access link has failed ("YES" of step 410), PE device 10B reroutes the packet received from the core network using the backup path, for example, by encapsulating the packet with a VXLAN header including the reroute tunnel endpoint as a destination VTEP address of the VXLAN header, and sends the packet including the reroute tunnel endpoint address on the backup path to PE device 10C over the core network (414).

When PE device 10C receives the packet including the reroute tunnel endpoint address (416), PE device 10C de-encapsulates the VXLAN header (418) and forwards the packet on Ethernet segment 14 to CE device 8C (420).

The techniques of this disclosure may be implemented in a wide variety of devices or apparatuses, including a network device, an integrated circuit (IC) or a set of ICs (i.e., a chip set). Any components, modules or units have been described provided to emphasize functional aspects and does not necessarily require realization by different hardware units. The techniques described herein may also be implemented in hardware or any combination of hardware and software and/or firmware. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable storage medium comprising instructions that, when executed in a processor, performs one or more of the methods described above. The computer-readable storage medium may be a physical structure, and may form part of a computer program product, which may include packaging materials. In this sense, the computer readable medium may be non-transitory. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The code or instructions may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

What is claimed is:

1. A device comprising:
a memory; and
one or more processors in communication with the memory and configured to:
receive, from a second device, a reroute tunnel endpoint address of the second device for a backup path to the second device,
wherein the device is configured to operate as a first provider edge (PE) device of an Ethernet segment of one or more Ethernet segments with reachability to a customer endpoint and the second device is configured to operate as a second provider edge (PE) device of the one or more Ethernet segments,
wherein the reroute tunnel endpoint address of the second devices is associated with a second split-horizon group that is different than a tunnel endpoint and a first split-horizon group of the second device for another path to the second device;
configure a backup path to the second device over a core network, wherein to configure the backup path comprises installing the reroute tunnel endpoint address and one or more corresponding actions to cause the device to encapsulate a packet received from the core network within a header including the reroute tunnel endpoint address as a destination tunnel endpoint address of the header;
receive a packet from the core network; and
reroute, based on the device being unable to send the packet to the customer endpoint, the packet on the backup path by encapsulating the header including the reroute tunnel endpoint address and forwarding the packet including the reroute tunnel endpoint address on the backup path to the second device over the core network to reach the customer endpoint.

2. The device of claim 1, wherein to receive the reroute tunnel endpoint address, the one or more processors are configured to receive an Ethernet Auto-Discovery route including the reroute tunnel endpoint address.

3. The device of claim 2, wherein the reroute tunnel endpoint address is included in an Egress Endpoint sub-TLV of a Border Gateway Protocol (BGP) Tunnel Encapsulation Attribute carried in the Ethernet Auto-Discovery route.

4. The device of claim 2, wherein the reroute tunnel endpoint address is included in a Border Gateway Protocol (BGP) transitive extended community.

5. The device of claim 1, wherein to receive the reroute tunnel endpoint address, the one or more processors are configured to receive a Media Access Control/Internet Protocol (MAC/IP) Advertisement route including the reroute tunnel endpoint address.

6. The device of claim 5, wherein the reroute tunnel endpoint address is included in a Border Gateway Protocol (BGP) transitive extended community.

7. A device comprising:
a memory; and
one or more processors coupled to the memory and configured to:
configure the device with a reroute tunnel endpoint address for a backup path to the device,
wherein the device is configured to operate as a first provider edge (PE) device of an Ethernet segment of one or more Ethernet segments with reachability to a customer edge (CE) device,
wherein the reroute tunnel endpoint address of the device is associated with a second split-horizon group that is different than a tunnel endpoint address and a first split-horizon group of the device for another path to the first device;
send the reroute tunnel endpoint address to a second device;
receive a packet encapsulated with a header including the reroute tunnel endpoint address as a destination tunnel endpoint address of the header; and
send the packet on the Ethernet segment to the CE device.

8. The device of claim 7, wherein to send the reroute tunnel endpoint address to the second device, the one or more processors are configured to send an Ethernet Auto-Discovery route including the reroute tunnel endpoint address.

9. The device of claim 8, wherein the reroute tunnel endpoint address is included in an Egress Endpoint sub-TLV of a Border Gateway Protocol (BGP) Tunnel Encapsulation Attribute carried in the Ethernet Auto-Discovery route.

10. The device of claim 8, wherein the reroute tunnel endpoint address is included in a Border Gateway Protocol (BGP) transitive extended community.

11. The device of claim 7, wherein to send the reroute tunnel endpoint address to the second device, the one or more processors are configured to send a Media Access Control/Internet Protocol (MAC/IP) Advertisement route including the reroute tunnel endpoint address.

12. The device of claim 11, wherein the reroute tunnel endpoint address is included in a Border Gateway Protocol (BGP) transitive extended community.

13. A method comprising:
receiving, by a first device and from a second device, a reroute tunnel endpoint address of the second device for a backup path to the second device,
wherein the first device is configured to operate as a first provider edge (PE) device of an Ethernet segment of one or more Ethernet segments with reachability to a customer endpoint and the second device is configured to operate as a second provider edge (PE) device of the one or more Ethernet segments,
wherein the reroute tunnel endpoint address of the second devices is associated with a second split-horizon group that is different than a tunnel endpoint and a first split-horizon group of the second device for another path to the second device;
configuring, by the first device, a backup path to the second device over a core network, wherein to configure the backup path comprises installing the reroute tunnel endpoint address and one or more corresponding actions to cause the device to encapsulate a packet received from the core network within a header including the reroute tunnel endpoint address as a destination tunnel endpoint address of the header;
receiving, by the first device, a packet from the core network; and
rerouting, by the first device and based on the device being unable to send the packet to the customer endpoint, the packet on the backup path by encapsulating the header including the reroute tunnel endpoint address and forwarding the packet including the reroute tunnel endpoint address on the backup path to the second device over the core network to reach the customer endpoint.

14. The method of claim 13, wherein receiving the reroute tunnel endpoint address comprises receiving an Ethernet Auto-Discovery route including the reroute tunnel endpoint address.

15. The method of claim 14, wherein the reroute tunnel endpoint address is included in an Egress Endpoint sub-TLV of a Border Gateway Protocol (BGP) Tunnel Encapsulation Attribute carried in the Ethernet Auto-Discovery route.

16. The method of claim 14, wherein the reroute tunnel endpoint address is included in a Border Gateway Protocol (BGP) transitive extended community.

17. The method of claim 13, wherein receiving the reroute tunnel endpoint address comprises receiving a Media Access Control/Internet Protocol (MAC/IP) Advertisement route including the reroute tunnel endpoint address.

18. The method of claim 17, wherein the reroute tunnel endpoint address is included in a Border Gateway Protocol (BGP) transitive extended community.

* * * * *